3,097,143
MYRISTYL-GAMMA-PICOLINIUM CHLORIDE PRESERVED POLIO VACCINE AND ITS PRODUCTION

Lee F. Schuchardt, North Wales, and Samuel Morton Zulick, Narberth, Pa., assignors to Merck & Co. Inc., Rahway, N.J., a corporation of New Jersey
No Drawing. Filed Mar. 30, 1960, Ser. No. 18,521
11 Claims. (Cl. 167—78)

This invention relates to vaccine products and to methods for preparing the same. More particularly, the invention relates to poliomyelitis vaccine products as well as poliomyelitis vaccines containing diphtheria, tetanus and pertussis antigens and to methods for preparing them.

For the prevention of paralytic poliomyelitis, it is now customary to inject a killed poliomyelities (aqueous) vaccine composed of killed but antigenic poliomyelitis viruses of types I, II and III. It is essential that the vaccine be sterile, that is, free from contaminating bacteria, molds and fungi not only at the time of manufacture and packaging but also at the time of administration. In an attempt to insure that the poliomyelitis virus vaccine will be free from contaminating bacteria, molds and fungi and to safely remain so it has been proposed to add a preservative such as thimerosal or benzethonium chloride, the latter being described in the U.S. patent to McLean, No. 2,793,160, granted May 21, 1957. Thimerosal, unfortunately, is not compatible with poliomyelitis vaccine since it causes the poliomyelitis vaccine to lose its potency. It is, accordingly, an object of this invention to provide a vaccine product which is free from contamination at the time of administration and also retains its antigenicity over a considerable period of time under normal conditions of storage.

Although benzthonium chloride has much less tendency than thimerosal to reduce the potency of polio vaccine, it is another object of this invention to provide a preservative having all of the advantages of benzethonium chloride and in some case having even less of an adverse effect upon the antigenicity of poliomyelitis vaccine.

Surprisingly these objects as well as other objects which will appear hereinafter can be realized and the aforementioned difficulties with poliomyelitis vaccine products overcome in accordance with the invention, by incorporating into a "killed" poliomyelitis or other vaccine, i.e., an aqueous solution containing non-infectious but antigenic poliomyelitis virus, or into a vaccine containing poliomyelitis antigen and any one of diphtheria, tetanus or pertussis antigens, a quaternary ammonium compound specifically identified as myristyl-gamma-picolinium chloride.

More particularly, the present invention comprises incorporating myristyl-gamma-picolinium chloride in an aqueous killed poliomyelitis vaccine in a concenration, grams per milliliter, in the range from about 1:5,000 to 1:80,000. The myristyl-gamma-picolinium chloride is preferably incorporated into the vaccine by slowly adding a dilute aqueous solution of the chloride to the aqueous killed poliomyelitis vaccine, with efficient stirring. The preferred products are those which contain myristyl-gamma-picolinium chloride in a concentration in the range from 1:20,000 to 1:40,000.

The aqueous, killed poliomyelitis vaccines used in the production of products of the invention can contain any or all of the various types of poliomyelitis virus. The preferred vaccines are those which contain types I, II and III of poliomyelitis virus. Particularly suitable vaccines are those which are relatively low in protein content, preferably those which contain less than about 18 to 20 gamma (micrograms) per ml. of protein nitrogen. Such vaccines can be produced in a number of different ways. For example, macerated monkey kidney tissue can be trypsinized to remove extraneous tissue, the residual cells allowed to multiply, the medium inoculated with the poliomyelitis virus, the mixture incubated, the fluid harvested and the living virus inactivated by treatment with formaldehyde, ultraviolet radiation or other suitable means. If desired, vaccines prepared by omission of the trypsinization step can also be used but in this instance the protein content of the vaccine may be excessively high and should be assayed before use. In the preparation of mixed vaccines, that is, vaccines containing more than one type of poliomyelitis virus, it is customary to pool or mix the harvested fluids containing the various types subsequent to the inactivation step although, if desired, this can be done preliminarily.

This invention is applicable not only to poliomyelitis vaccines containing any one of type I, II or III virus, but is applicable as well to combinations of any one or more of such viruses with other ingredients such, for example, as diphtheria toxoid, tetanus toxoid, or heat detoxified pertussis organisms or fractions thereof for example. The practice of using combined diphtheria, pertussis and tetanus antigens is well established, and the efficiency of such combination in pediatric practice has been discussed by Ipsen and Bowen in A.J.P.H. 45, 3:312–318 (March 1955). Heretofore, the combined diphtheria, pertussis and tetanus antigens have been conventionally preserved by thimerosal which is sodium-ethyl-mercurithiosalicylate in quantities of about 1:10,000. One method of making the combined diphtheria, pertussis and tetanus antigens is disclosed in the patent to Pillemer, No. 2,528,972. Moreover, a method of preparing a combined poliomyelitis-diphtheria-tetanus-pertussis antigen product is disclosed in my co-pending patent application Serial No. 770,905, filed October 31, 1958. This application refers to the incorporation of benzthonium chloride into the four-way vaccine as a preservative therefor.

Specific examples of vaccines, utilizing the preservative in accordance with this invention, appear in the following tables. In each table, the quantity of poliomyelitis vaccine is expressed in milliliters of Salk vaccine; each milliliter contains from .035–0.35 microgram of type I poliovirus, .01–0.1 microgram of type II poliovirus and .01–0.1 microgram of type III poliovirus.

EXAMPLES 1–5

*Four-way Vaccine (0.5 Ml. Dosage; Total Human Dose 1.5 Ml.)*

| | | | | | |
|---|---|---|---|---|---|
| Poliomyelitis killed virus, Types I, II and III (ml. Salk vaccine/ml. total) | 0.4 | 0.41 | 0.43 | 0.44 | 0.45 |
| Diphtheria toxoid ($L_f$/ml.) | 25 | 100 | 75 | 85 | 50 |
| Pertussis cells (opacity units/ml.) | 32 | 20 | 28 | 16 | 24 |
| Tetanus toxoid ($L_f$/ml.) | 10 | 40 | 30 | 25 | 20 |
| Myristyl-gamma-picolinium chloride (parts by weight) | 1/60,000 | 1/30,000 | 1/5000 | 1/80,000 | 1/40,000 |

EXAMPLES 6-10

*Four-Way Vaccine (1 Ml. Dosage; Total Human Dose 3 Ml.)*

| | | | | | |
|---|---|---|---|---|---|
| Poliomyelitis killed virus, Types I, II and III (ml. Salk vaccine/ml.) total | .4 | .95 | .6 | .90 | .5 |
| Diphtheria toxoid (Lf/ml.) | 50 | 12.5 | 40 | 25 | 35 |
| Pertussis cells (opacity units/ml.) | 8 | 16 | 10 | 12 | 14 |
| Tetanus toxoid (Lf/ml.) | 5 | 20 | 15 | 10 | 12 |
| Myristyl-gamma-picolinium chloride (parts by weight) | 1/20,000 | 1/5,000 | 1/10,000 | 1/40,000 | 1/80,000 |

EXAMPLE 34

Samples of poliomyelitis vaccine were preserved with myristyl-gamma-picolinium chloride in a quantity of 1:40,000 parts by weight as in Example 14. Samples of the vaccine were held at 37° C. for 7 days and tested in chicks for polio antigenicity. Chicks were injected intramuscularly with 0.5 ml. of neat (undiluted) vaccine and were again injected intramuscularly with 0.5 ml. of neat vaccine 14 days later. The chicks were bled on the 21st day. A serum was prepared from the collection blood and the number of antibodies present in the serum detected. Such tests were carried out by the metabolic inhibition method which is a well known method and is described in detail in Salk, J. E., Younger, J. S., and Ward, E. N., "Use of Color Change of Phenol Red as the Indicator in Titrating Poliomyelitis Virus or Its Antibody in a Tissue-Culture System," Am. J. of Hygiene 60, 214–230, 1954. The metabolic inhibition method was carried out at a 1:8 dilution against approximately 100 $ID_{50}$'s of the three types of poliomyelitis virus. The results of such tests are summarized in Table I which follows:

TABLE I

| Preservative | Part A | | | Part B | | | Part C | | | Part D | | | Total conversions |
|---|---|---|---|---|---|---|---|---|---|---|---|---|---|
| | Poliomyelitis Type I | Poliomyelitis Type II | Poliomyelitis Type III | Poliomyelitis Type I | Poliomyelitis Type II | Poliomyelitis Type III | Poliomyelitis Type I | Poliomyelitis Type II | Poliomyelitis Type III | Poliomyelitis Type I | Poliomyelitis Type II | Poliomyelitis Type III | |
| Myristyl-gamma-picolinium chloride | [1] 11/14 | 12/14 | 13/14 | 7/14 | 13/14 | 14/14 | 12/14 | 14/14 | 14/14 | 14/15 | 15/15 | 15/15 | 154/171=90%. |
| None—37° C | 8/15 | 14/15 | 13/15 | 6/14 | 12/14 | 14/14 | 11/14 | 14/14 | 14/14 | 13/15 | 15/15 | 14/15 | 148/174=8%. |
| None—2-5° C | 14/15 | 14/15 | 14/15 | 10/15 | 14/15 | 15/15 | 14/15 | 14/15 | 14/15 | 15/15 | 15/15 | 15/15 | 168/180=93%. |
| Virus $ID_{50}$ | 398 | 446 | 501 | 335 | 177 | 316 | 100 | 100 | 89 | 89 | 100 | 56 | |

[1] Conversions/totals.

EXAMPLES 11-20

*Poliomyelitis Vaccine*

| Poliomyelitis killed virus, Types I, II and III (ml.) | Myristyl-gamma-picolinium chloride (Parts by weight) |
|---|---|
| 1 | 1/5,000 |
| 1 | 1/80,000 |
| 1 | 1/60,000 |
| 1 | 1/40,000 |
| 1 | 1/35,000 |
| 1 | 1/10,000 |
| 1 | 1/20,000 |
| 1 | 1/55,000 |
| 1 | 1/75,000 |
| 1 | 1/65,000 |

The following table shows the effect of aging at 2-5° C. for 6 months. These results were obtained by holding samples of the above vaccine containing 1/40,000 parts by weight of myristyl-gamma-picolinium chloride at 2-5° C. for 6 months and then testing for polio potency in chicks. Groups of 8 chicks were injected intramuscularly with 1 ml. of vaccine diluted 1:3, 1:30 or 1:300 on 0 and 14 days. On the 21st day all of the chicks were bled. The test was repeated on four successive weeks. All sera were tested for virus neutralization by the metabolic inhibition method at a 1:8 dilution against approximately 100 $ID_{50}$'s of the three types of poliomyelitis virus. Both the initial and the 6-month assays were run using NIH 2A Reference Vaccine. The results are summarized in Table II which follows:

EXAMPLES 21-26

| | | | | | | |
|---|---|---|---|---|---|---|
| Poliomyelitis killed virus, Types I, II and III (ml. Salk vaccine/ml. total) | .4 | .4 | .6 | .95 | .75 | .85 |
| Tetanus toxoid (Lf/ml.) | 40 | 10 | 5 | 10 | 15 | 20 |
| Myristyl-gamma-picolinium chloride (parts by weight) | 1/40,000 | 1/5,000 | 1/80,000 | 1/40,000 | 1/60,000 | 1/20,000 |

EXAMPLES 27-33

| | | | | | | | |
|---|---|---|---|---|---|---|---|
| Poliomyelitis killed virus, Types I, II and III (ml. Salk vaccine/ml. total) | .4 | .45 | .4 | .95 | .6 | .90 | .80 |
| Diphtheria toxoid (Lf/ml.) | 4.0 | 4.0 | 4.0 | 2.0 | 2.0 | 2.0 | 2.0 |
| Tetanus toxoid (Lf/ml.) | 20 | 10 | 40 | 10 | 5 | 15 | 20 |
| Myristyl-gamma-picolinium chloride (parts by weight) | 1/40,000 | 1/5,000 | 1/30,000 | 1/40,000 | 1/15,000 | 1/80,000 | 1/60,000 |

TABLE II

[Chick potency results of vaccines aged 6 months—ratio of test vaccine to NIH 2A Reference Vaccine]

| Preservative | Poliovirus type | | | | | |
|---|---|---|---|---|---|---|
| | I | | II | | III | |
| | Lot 1 | Lot 2 | Lot 1 | Lot 2 | Lot 1 | Lot 2 |
| Myristyl-gamma-picolinium chloride | 1.20 | 1.35 | 0.69 | 3.02 | 2.46 | 1.78 |
| Original | 2.34 | 3.24 | 0.81 | 1.15 | 2.09 | 1.35 |

The above examples indicate that myristyl-gamma-picolinium chloride is not antagonistic to poliomyelitis vaccine and the vaccine product of the invention retained its potency with respect to all three types of virus over storage at 2–5° C. for 6 months. In contrast to this, vaccines to which thimerosal has been added as a preservative completely lose their potency with respect to all three types of the virus under the same conditions of storage. The control samples retained their potency under the same conditions of storage but were susceptible to contamination from molds and fungi. It is important to observe that there was no significant difference between the potency of the vaccine products containing myristyl-gamma-picolinium chloride and the potency of the control samples.

Although this application specifically discloses myristyl-gamma-picolinium chloride, it will be appreciated that the other compatible halides are to be considered as equivalents of the chloride and are intended to be embraced within the scope of the invention as such.

Although this invention has been described with reference to particular poliomyelitis antigens, it will be appreciated that it applies as well to specially treated products such as the purified poliomyelitis vaccine, for example, as disclosed in the co-pending application of Jesse Charney, Serial No. 839,543, filed September 10, 1959, which is assigned to the assignee hereof.

The effectiveness of myristyl-gamma-picolinium chloride in accordance with this invention is not a common characteristic of the quaternary ammonium compounds. Cetyl dimethyl benzyl ammonium chloride has been proved to destroy the antigenicity of poliomyelitis vaccine.

Having thus described our invention, we claim:

1. A poliomyelitis vaccine product comprising an aqueous solution containing at least one type of killed but antigenic poliomyelitis virus and myristyl-gamma-picolinium chloride in a concentration in the range from 1:5,000 and 1:80,000.

2. A vaccine product comprising an aqueous solution containing killed but antigenic poliomyelitis virus and at least one antigen selected from the group consisting of diphtheria, tetanus and pertussis antigens and myristyl-gamma-picolinium chloride in a concentration in the range of from 1:5,000 and 1:80,000.

3. A poliomyelitis vaccine product comprising an aqueous solution of killed but antigenic types I, II and III of poliomyelitis virus and myristyl-gamma-picolinium chloride in a concentration in the range from 1:20,000 and 1:40,000.

4. A poliomyelitis vaccine product comprising an aqueous solution of killed but antigenic types I, II and III of poliomyelitis virus containing less than 18 to 20 micrograms per milliliter of protein nitrogen and myristyl-gamma-picolinium chloride in a concentration in the range of from 1:5,000 and 1:80,000.

5. A poliomyelitis vaccine product comprising an aqueous solution of killed but antigenic types I, II and III of poliomyelitis virus containing less than 18 to 20 micrograms per milliliter of protein nitrogen and myristyl-gamma-picolinium chloride in a concentration of 1:20,000.

6. A poliomyelitis vaccine product comprising an aqueous solution of killed but antigenic types I, II and III of poliomyelitis virus containing less than 18 to 20 micrograms per milliliter of protein nitrogen and myristyl-gamma-picolinium chloride in a concentration of 1:40,000.

7. Process for producing a poliomyelitis vaccine product which comprises adding sufficient myristyl-gamma-picolinium chloride to an aqueous solution containing at least one type of killed but antigenic poliomyelitis virus to produce a solution containing myristyl-gamma-picolinium chloride in a concentration in the range from 1:5,000 and 1:80,000.

8. Process of producing a poliomyelitis vaccine product which comprises adding sufficient myristyl-gamma-picolinium chloride to an aqueous solution of killed but antigenic types I, II and III of poliomyelitis virus to produce a solution containing myristyl-gamma-picolinium chloride in a concentration in the range from 1:20,000 and 1:40,000.

9. A vaccine product comprising an aqueous solution containing combined poliomyelitis vaccine and tetanus toxoid, said poliomyelitis vaccine consisting essentially of at least one type of killed but antigenic poliomyelitis virus, and myristyl-gamma-picolinium chloride in a concentration in the range of from 1:5,000 and 1:80,000.

10. A vaccine product comprising an aqueous solution containing combined poliomyelitis-diphtheria-tetanus-pertussis antigens, said poliomyelitis antigen consisting essentially of at least one type of killed poliomyelitis virus, and myristyl-gamma-picolinium chloride in a concentration in the range of from 1:5,000 and 1:80,000.

11. A vaccine product comprising an aqueous solution containing combined poliomyelitis, diphtheria and tetanus antigens, said poliomyelitis antigen consisting essentially of at least one type of killed poliomyelitis virus, and myristyl-gamma-picolinium chloride in a concentration of from 1:5,000 and 1:80,000.

References Cited in the file of this patent

UNITED STATES PATENTS 2,793,160   McLean ---------------- May 21, 1957

OTHER REFERENCES

Lawrence Surface Active Quaternary Ammonium Germicides, pub. 1950 by Academic Press Inc., New York, New York, pp. 108–111 and 131.

Gard, World Health Organization, Monograph Series No. 26, pp. 225–235, 1955.

Kendrick, Am. J. of Pub. Health, April 1957, pp. 473–483.